US012632832B2

(12) United States Patent
Telang et al.

(10) Patent No.: US 12,632,832 B2
(45) Date of Patent: May 19, 2026

(54) RUNTIME OPTIMIZATIONS TO DATA MODELS FOR FACILITY MAINTENANCE OPERATIONS

(71) Applicant: HONEYWELL INTERNATIONAL INC., Charlotte, NC (US)

(72) Inventors: Jayalaxmi Telang, Bangalore (IN); Ronny Scherf, Neundorf (DE); Manu Taranath, Bangalore (IN); Naveen Prabhu, Bangalore (IN); Nishit Nagar, Indore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 187 days.

(21) Appl. No.: 18/393,738

(22) Filed: Dec. 22, 2023

(65) Prior Publication Data

US 2024/0211896 A1      Jun. 27, 2024

(30) Foreign Application Priority Data

Dec. 22, 2022    (IN) .............................. 202241074531

(51) Int. Cl.
  *G06Q 30/00*          (2023.01)
  *G06Q 10/20*          (2023.01)
(52) U.S. Cl.
  CPC .................................... *G06Q 10/20* (2013.01)
(58) Field of Classification Search
  None
  See application file for complete search history.

(56) References Cited

U.S. PATENT DOCUMENTS 11,126,635 B2      9/2021  Behzadi et al.
2014/0358645 A1*  12/2014  Ehrman ........... G06Q 10/06393
                                                            705/7.39

(Continued)

OTHER PUBLICATIONS

Fajar, Y., Kurniawan, L. A., Nurlailly, S., & Rizkiandi, T. (2022). Determining The Type of Maintenance by Using Multi-Attribute Utility Theory Case Study: Small and Medium Enterprises Printing . . . (Year: 2022).*

(Continued)

*Primary Examiner* — Matthew T Sittner
(74) *Attorney, Agent, or Firm* — ALSTON & BIRD LLP

(57) ABSTRACT

Techniques for runtime optimizations to data models for facility maintenance operations are described. In operation, a custom request from a user to modify a data model of a facility, where the data model is indicative of information corresponding to assets monitored in the facility, and where the data model of the facility includes asset data corresponding to each asset of the facility and key performance indicators (KPIs) corresponding to each asset of the facility. A category of the custom request is then identified to generate a query list corresponding to the category of custom request for modifying asset data in the data model, where the custom request includes at least one of updating asset data corresponding to an asset of the facility and introducing new asset data in the data model. A custom input from the user is then received in response to the query list generated and modifying the data model in correspondence to the custom input. The data model is subsequently executed with modified asset data in runtime for dynamic monitoring of the facility.

16 Claims, 10 Drawing Sheets

(56) References Cited

U.S. PATENT DOCUMENTS

| | | | |
|---|---|---|---|
| 2015/0088467 A1* | 3/2015 | Skoropinski | G06F 3/04815 |
| | | | 703/1 |
| 2015/0301548 A1* | 10/2015 | Goparaju | G06N 20/00 |
| | | | 700/286 |
| 2016/0364456 A1* | 12/2016 | Trenchard | G06F 16/2465 |
| 2017/0006135 A1 | 1/2017 | Siebel et al. | |
| 2017/0061444 A1* | 3/2017 | Wall | G06Q 50/06 |
| 2018/0307551 A1* | 10/2018 | Bacha | G06F 11/079 |
| 2018/0314833 A1* | 11/2018 | Vittal | G06Q 10/0635 |
| 2018/0373785 A1* | 12/2018 | Dubyak | G06N 5/045 |
| 2021/0034581 A1 | 2/2021 | Boven et al. | |
| 2021/0360083 A1 | 11/2021 | Duggal et al. | |
| 2021/0389756 A1* | 12/2021 | Al Matouq | G05B 19/41865 |
| 2022/0058432 A1* | 2/2022 | Savvides | G06N 3/042 |
| 2022/0198565 A1 | 6/2022 | Krishnaswamy et al. | |
| 2022/0245469 A1* | 8/2022 | Mukherjee | G06N 5/022 |
| 2023/0065468 A1* | 3/2023 | Lu | G10L 15/063 |

OTHER PUBLICATIONS

Ogbeifun, E., Mbohwa, C., & Pretorius, J. H. C. (2016). Developing KPIs for organizations with similar objectives . . . (Year: 2016).*
Sandy Ryza, Introducing Software-Defined Assets, Mar. 1, 2022. https://dagster.io/blog/software-defined-assets.
Oracle, Use Asset Metrics or Key Performance Indicators, 23.3.1, E80558-42, Jul. 2023, p. 4. https://docs.oracle.com/en/cloud/saas/iot-asset-cloud/iotaa/using-oracle-iot-asset-monitoring-cloud-service.pdf.

* cited by examiner

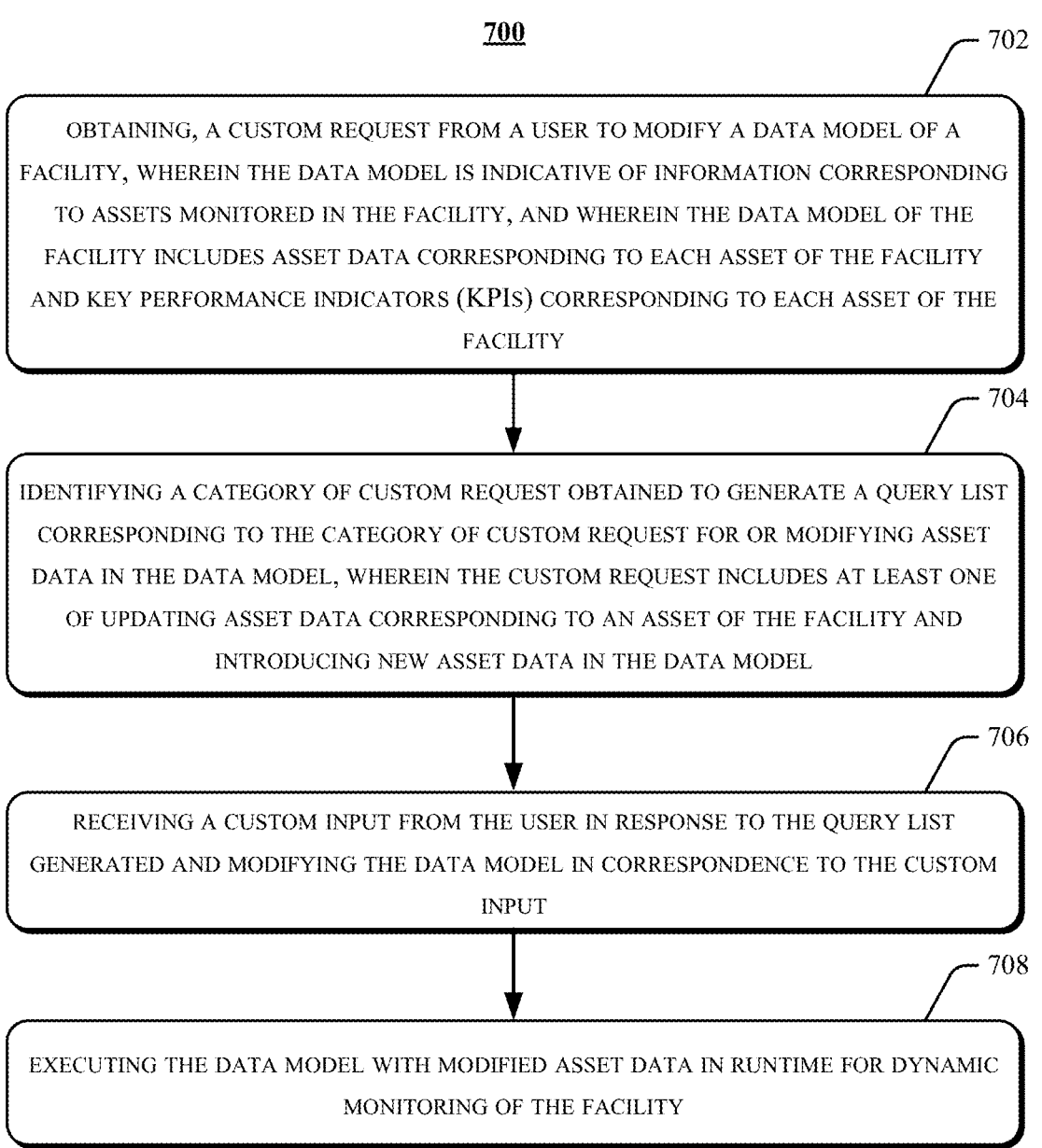

700

702

OBTAINING, A CUSTOM REQUEST FROM A USER TO MODIFY A DATA MODEL OF A FACILITY, WHEREIN THE DATA MODEL IS INDICATIVE OF INFORMATION CORRESPONDING TO ASSETS MONITORED IN THE FACILITY, AND WHEREIN THE DATA MODEL OF THE FACILITY INCLUDES ASSET DATA CORRESPONDING TO EACH ASSET OF THE FACILITY AND KEY PERFORMANCE INDICATORS (KPIS) CORRESPONDING TO EACH ASSET OF THE FACILITY

704

IDENTIFYING A CATEGORY OF CUSTOM REQUEST OBTAINED TO GENERATE A QUERY LIST CORRESPONDING TO THE CATEGORY OF CUSTOM REQUEST FOR OR MODIFYING ASSET DATA IN THE DATA MODEL, WHEREIN THE CUSTOM REQUEST INCLUDES AT LEAST ONE OF UPDATING ASSET DATA CORRESPONDING TO AN ASSET OF THE FACILITY AND INTRODUCING NEW ASSET DATA IN THE DATA MODEL

706

RECEIVING A CUSTOM INPUT FROM THE USER IN RESPONSE TO THE QUERY LIST GENERATED AND MODIFYING THE DATA MODEL IN CORRESPONDENCE TO THE CUSTOM INPUT

708

EXECUTING THE DATA MODEL WITH MODIFIED ASSET DATA IN RUNTIME FOR DYNAMIC MONITORING OF THE FACILITY

Fig. 7

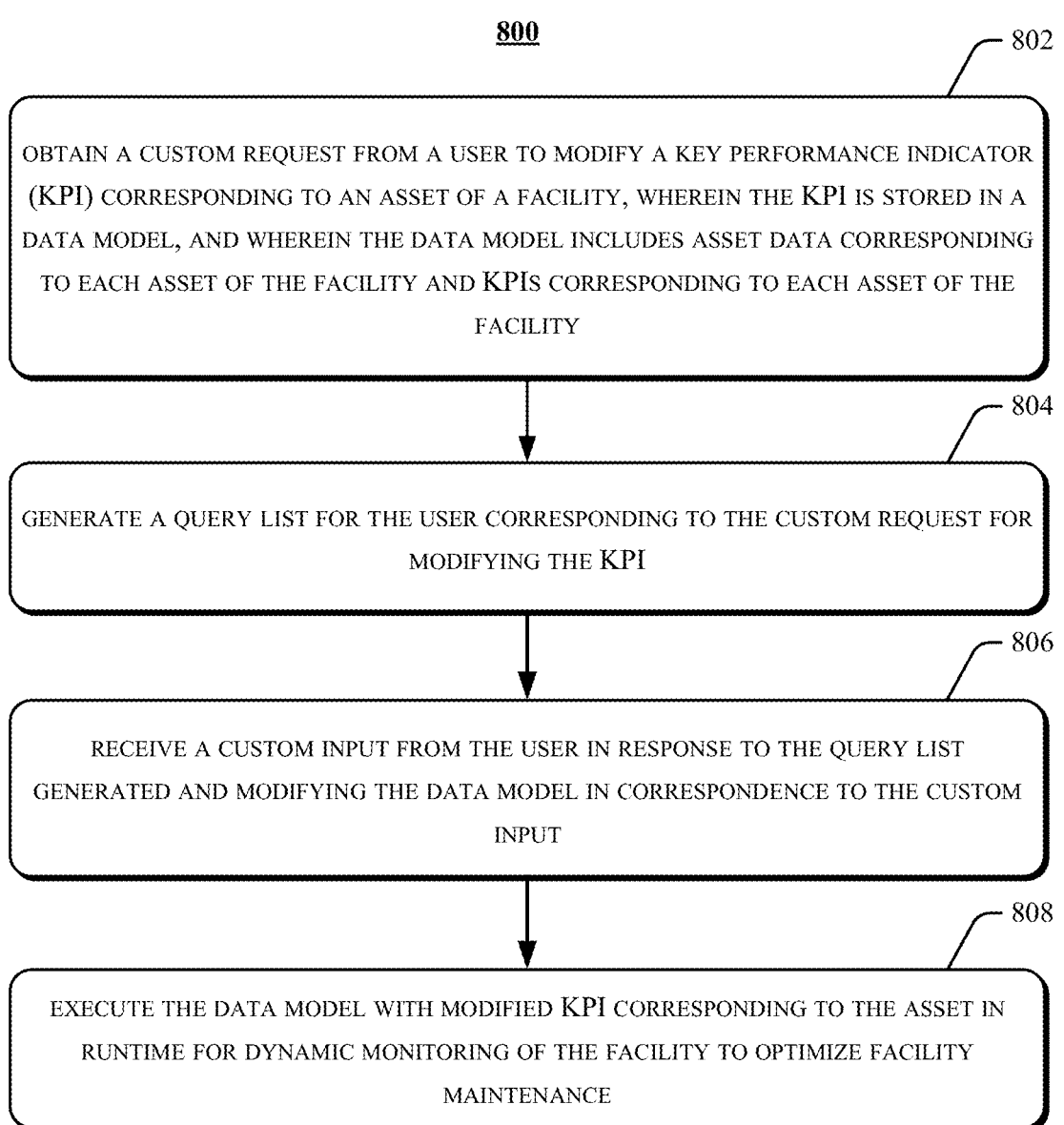

800

802

OBTAIN A CUSTOM REQUEST FROM A USER TO MODIFY A KEY PERFORMANCE INDICATOR (KPI) CORRESPONDING TO AN ASSET OF A FACILITY, WHEREIN THE KPI IS STORED IN A DATA MODEL, AND WHEREIN THE DATA MODEL INCLUDES ASSET DATA CORRESPONDING TO EACH ASSET OF THE FACILITY AND KPIS CORRESPONDING TO EACH ASSET OF THE FACILITY

804

GENERATE A QUERY LIST FOR THE USER CORRESPONDING TO THE CUSTOM REQUEST FOR MODIFYING THE KPI

806

RECEIVE A CUSTOM INPUT FROM THE USER IN RESPONSE TO THE QUERY LIST GENERATED AND MODIFYING THE DATA MODEL IN CORRESPONDENCE TO THE CUSTOM INPUT

808

EXECUTE THE DATA MODEL WITH MODIFIED KPI CORRESPONDING TO THE ASSET IN RUNTIME FOR DYNAMIC MONITORING OF THE FACILITY TO OPTIMIZE FACILITY MAINTENANCE

Fig. 8

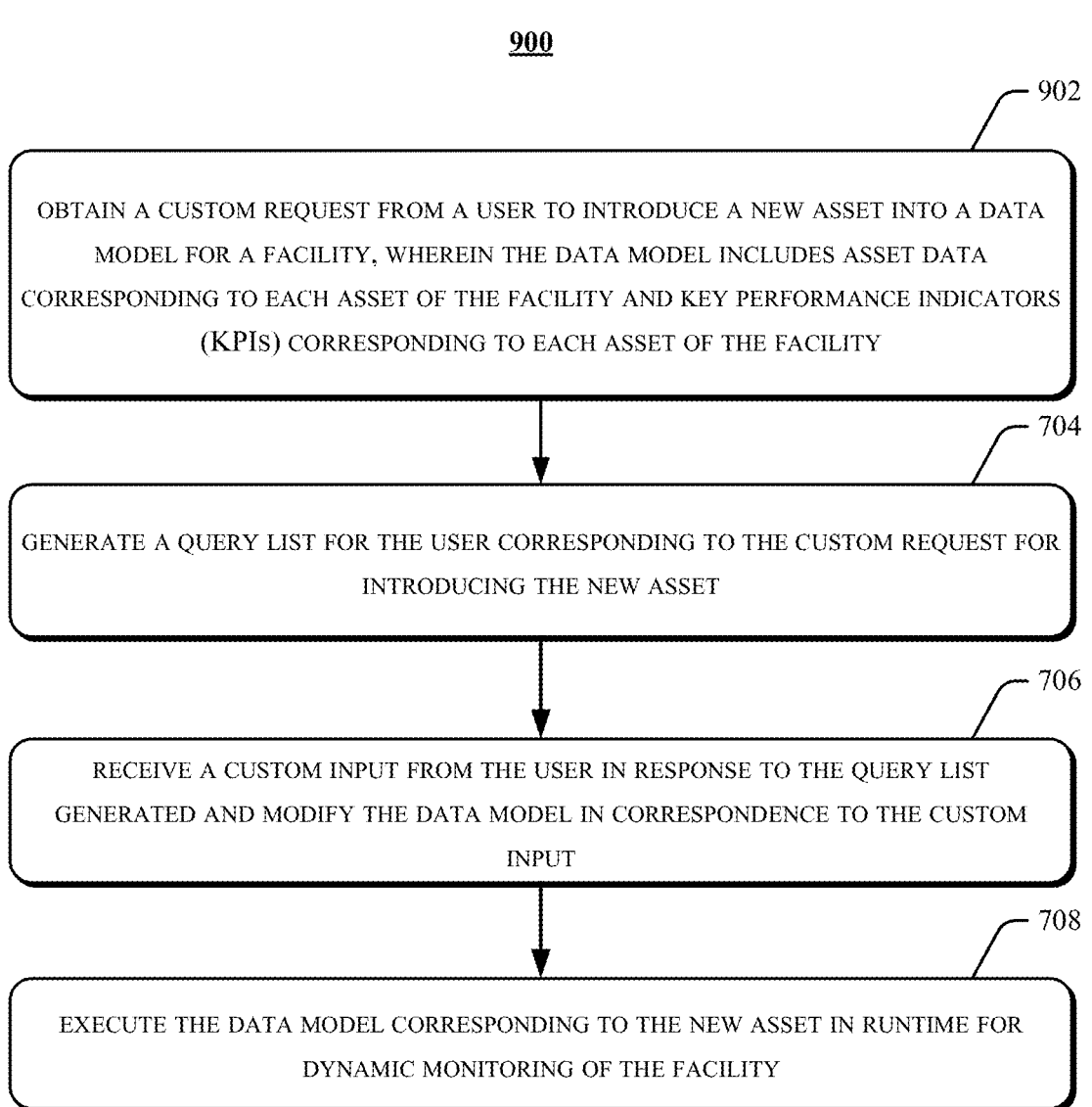

900

902

OBTAIN A CUSTOM REQUEST FROM A USER TO INTRODUCE A NEW ASSET INTO A DATA MODEL FOR A FACILITY, WHEREIN THE DATA MODEL INCLUDES ASSET DATA CORRESPONDING TO EACH ASSET OF THE FACILITY AND KEY PERFORMANCE INDICATORS (KPIS) CORRESPONDING TO EACH ASSET OF THE FACILITY

704

GENERATE A QUERY LIST FOR THE USER CORRESPONDING TO THE CUSTOM REQUEST FOR INTRODUCING THE NEW ASSET

706

RECEIVE A CUSTOM INPUT FROM THE USER IN RESPONSE TO THE QUERY LIST GENERATED AND MODIFY THE DATA MODEL IN CORRESPONDENCE TO THE CUSTOM INPUT

708

EXECUTE THE DATA MODEL CORRESPONDING TO THE NEW ASSET IN RUNTIME FOR DYNAMIC MONITORING OF THE FACILITY

Fig. 9

RUNTIME OPTIMIZATIONS TO DATA MODELS FOR FACILITY MAINTENANCE OPERATIONS

TECHNICAL FIELD

The present subject matter relates, in general, to asset management in a facility, and in particular, to run-time optimization of data models for facility maintenance operations.

BACKGROUND

Generally, in the realm of facility management, multiple systems are employed for monitoring and maintaining assets in a facility. Monitoring and maintenance of assets such as machinery, equipment, and other operational components is of paramount concern. These assets, which can range from manufacturing equipment in a factory to HVAC systems in a commercial building, play a pivotal role in the overall operation and efficiency of the facility. Therefore, the ability to monitor the performance and health of these assets is a core function of facility management.

SUMMARY

In an example, a method for run-time optimization of data models for facility maintenance operation is described. In operation, a custom request to modify a data model of a facility is received from a user. The data model is indicative of information corresponding to assets monitored in the facility. Further, the data model includes asset data corresponding to each asset of the facility and key performance indicators (KPIs) corresponding to each asset of the facility. A category of the custom request is then identified. The category of the custom request is identified to generate a query list corresponding to the category of custom request for modifying asset data in the data model. The custom request includes at least one of updating asset data corresponding to an asset of the facility and introducing new asset data in the data model. A custom input is then received from the user, where the custom input is received in response to generation of the query list. The data model is then modified in correspondence to the custom input. The data model is subsequently executed with modified asset data in runtime for dynamic monitoring of the facility.

In another example, an Asset Management System (AMS) for run-time optimization of data models for facility maintenance operation is described. In an example, the AMS includes at least one memory storing instructions that, when executed by the at least one processor, cause the AMS obtain a custom request from a user to modify a key performance indicator (KPI) corresponding to an asset of a facility, where the KPI is stored in a data model, and where the data model includes asset data corresponding to each asset of the facility and KPIs corresponding to each asset of the facility. The at least one processor then causes the AMS to generate a query list corresponding to the custom request for modifying the KPI. Thereafter, the at least one processor causes the AMS to receive a custom input from the user in response to the query list generated and modify the data model in correspondence to the custom input. The at least one processor subsequently causes the AMS to execute the data model with modified KPI corresponding to the asset in runtime for dynamic monitoring of the facility.

In yet another example, a non-transitory computer-readable medium comprising instructions for run-time optimization of data models for facility maintenance operation is described. In operation, the instructions cause a processor to obtain a custom request from a user to introduce a new asset into a data model for a facility, where the data model includes asset data corresponding to each asset of the facility and key performance indicators (KPIs) corresponding to each asset of the facility. The instructions further cause the processor to generate a query list for the user corresponding to the custom request for introducing the new asset. Further, the instructions cause the processor to receive a custom input from the user in response to the query list generated and modify the data model in correspondence to the custom input. Moreover, the instructions cause the processor to execute the data model corresponding to the new asset in runtime for dynamic monitoring of the facility.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 7 illustrates a method for run-time optimization of data models for facility maintenance operation, in accordance with an example implementation of the present subject matter.

FIG. 8 illustrates a method for run-time optimization of data models for facility maintenance operation, in accordance with another example implementation of the present subject matter.

FIG. 9 illustrates a method for run-time optimization of data models for facility maintenance operation, in accordance with yet another example implementation of the present subject matter.

DETAILED DESCRIPTION

Figure 1:
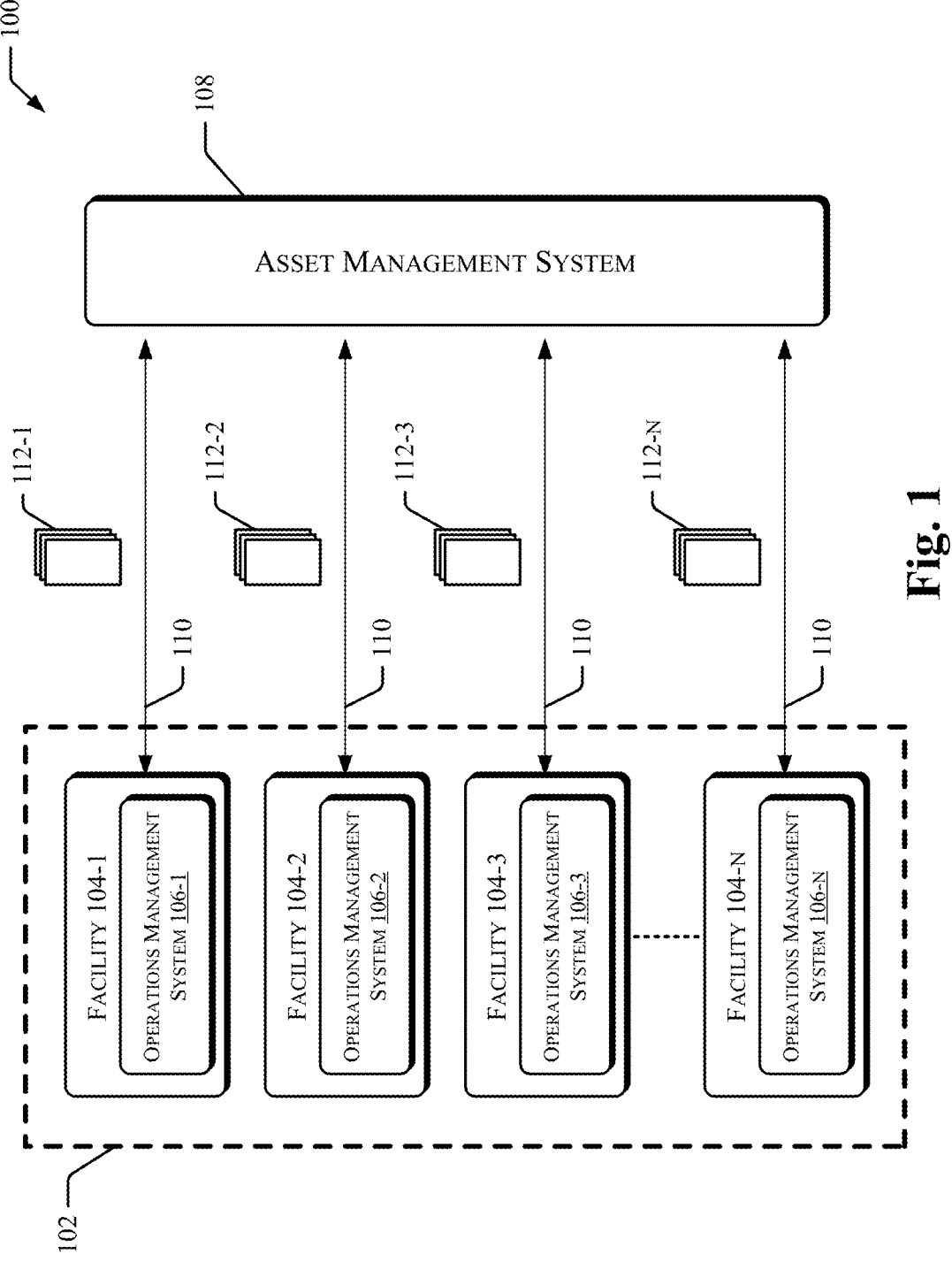
FIG. 1 illustrates a supply chain network environment, in accordance with an example of the present subject matter.

Traditionally, monitoring of assets in a facility is performed through analyzing data collected from various sensors attached to an asset. These sensors can track a wide array of operational metrics, such as temperature, pressure, vibration, energy usage, and more. The data collected by these sensors provides a wealth of information about the asset's performance and condition, allowing facility managers to make informed decisions about maintenance, adjustments, potential replacements, increasing production output of the concerned, and ensuring a safe work environment. Key Performance Indicators (KPIs) are often used in this context as a means of quantifying and evaluating the performance of an asset. A KPI might, for example, measure the efficiency of a machine in terms of the amount of product it produces per hour, or the energy it consumes in the process. These KPIs provide a standardized way of assessing performance, making it easier to identify issues and track improvements over time.

However, in an organization involving hundreds of such facilities located at different geographical locations, obtaining, integrating, and monitoring the asset data is challenging. Further, the process of defining and implementing KPIs can be significantly complex and time-consuming. Typically, it involves a deep understanding of the asset's operation, the ability to interpret sensor data, and the skills to translate this into a meaningful KPI. Furthermore, once a KPI has been defined, it often requires a substantial amount of time and resources to integrate it into the facility's data model and monitoring systems.

Typically, if personnel involved in the decision-making process, such as a facility manager, wishes to monitor or manage a particular asset of the facility, the personnel may have to reach out to a different team, such as an engineering team. The engineering team may further overhaul their maintenance systems to hardcode the modified KPI or data associated with the new asset into the monitoring system. This is a time consuming, and a cumbersome process. Also, overhauling of maintenance systems may also result in downtime or delay, which could result in additional costs and may even affect the safety of individuals.

Moreover, the dynamic nature of facility operations means that the relevance and usefulness of a KPI can change over time. Also, with the evolution of time, new assets may be introduced in the facility and the data corresponding to such assets needs to be updated in the data models to facilitate efficient monitoring and maintenance of the said asset. As the facility's goals, processes, and assets evolve, so do the metrics by which performance is measured. Therefore, it would be important to adapt and evolve with the facility, allowing for the modification and addition of KPIs, and introduction of new assets of the facility in real-time.

According to examples of the present subject matter, techniques to optimize data models in an asset management system of a facility in run-time are discussed. Techniques of the present subject matter provide a real-time optimization of data models for monitoring and managing assets in a facility, such as a manufacturing plant, a warehouse, or any other commercial or industrial facility that houses multiple assets.

For example, a facility manager monitoring a facility, such as facility 'A' notices that it would be beneficial to monitor the KPI for an asset 'X' every 15 minutes instead of every one hour, the facility manager can make a custom request to modify the pre-defined schedule for calculating the said KPI for the said asset 'X'. Based on the custom request made by the facility manager, techniques of the present subject matter may identify the asset 'X' amongst various assets of the facility and accordingly a data model corresponding to asset 'X' may be identified. Depending on the custom request made by the facility manager, which is to modify the KPI associated with the schedule of asset 'A', a query list may be generated and presented to the facility manager. The facility manager may provide a custom input in response to the query list generated, for example, may provide the schedule which is to be modified for a predefined KPI of the asset 'X'. Based on this custom input provided for the asset 'X', the data model associated with asset 'X' may be modified and then executed to generate the said KPI every 15 minutes. Similarly, if the facility manager wishes to introduce a new asset to facility 'A', such as asset 'Z', the facility manager may request addition of data corresponding to a new asset 'Z' to the data model. Based on the custom request made by the facility manager, techniques of the present subject matter may generate a query list and present the same to the facility manager. The facility manager may provide a custom input in response to the query list generated, for example, may provide an asset ID, type of data to be acquired for the said asset 'Z' and the like. Based on this custom input provided for the asset 'Z', the data model may be modified. Similarly, the facility manager can monitor and maintain various assets housed in a facility across various facilities of a supply chain network.

In operation, a custom request may be received from a user to modify the data model of the facility. This custom request can include updating the data model corresponding to an asset of the facility or introducing data associated with a new asset in the data model. The data model of the facility includes asset data corresponding to each asset of the facility and KPIs corresponding to each asset of the facility.

In response to the custom request, techniques of the present subject matter identify a category of the custom request and generate a query list for the user corresponding to the category of the custom request for modifying the data model. Further, in response to the query list generated, a custom input from the user is received and the data model is modified in correspondence to the custom input. Once the data model has been modified, the data model may be executed with the modified asset data in runtime for dynamic monitoring of the facility. This allows for the optimization of facility maintenance operations in real-time, providing a more efficient and effective way of managing and maintaining the assets within the facility.

The above and other features, aspects, and advantages of the subject matter will be explained with regard to the following description and accompanying figures. It should be noted that the description and figures merely illustrate the principles of the present subject matter along with examples described herein and should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1 illustrates a supply chain network environment 100, in accordance with an example implementation of the present subject matter. In an example, the supply chain network environment 100 may include a supply chain network 102 including multiple facilities, 104-1, 104-2, 104-3, . . . 104-n, collectively and alternatively referred to as multiple facilities 104 or facility 104. For example, but not limited to, the facility 104 may be a warehouse in a packaging industry, an assembling unit of an automobile manufacturing company, a consumer-goods manufacturing unit, an e-commerce storage unit, a cold storage of a food manufacturing company, a pharmaceutical manufacturing unit, a distributer of a logistics company, and the like. In one example, the multiple facilities 104 may be distributed across different locations in the supply chain network 102.

Each of the multiple facilities 104 may include an operations management system 106-1, 106-2, 106-3, . . . , 106-*n*, collectively and alternatively referred to as multiple operations management systems 106 or operations management system 106. In an example, the operations management system 106 may be employed to monitor and manage the operations of assets within the facility. Assets may include any machinery, vehicles, or equipment that is used in a commercial or industrial facility or organization. Examples of asset may include, but are not limited to, pipelines, liquid storage tanks, vehicles, air pumps, cranes, condensers, filters, etc.

Further, each of the assets may include a plurality of sensors (not shown) coupled thereto. The plurality of sensors may be used to track various mechanical, functional, or operational metrics regarding the assets. For example, if asset is a pipe, the plurality of sensors may include fill level, flow rate, pressure, and/or temperature sensors. Some sensors may detect vibrations or energy usage. Further, if asset is a bulldozer, the plurality of sensors may include oil, gas, speed, acceleration, RPM (revolutions per minute), mileage, and engine temperature. In an example, the operation management 106 may be coupled to the plurality of sensors to receive raw data from plurality of sensors that are monitoring the assets. The operations management system 106 may further be able to identify which raw data comes from which sensor and associate it with the corresponding asset(s).

In an example, the supply chain network environment 100 may further include an Asset Management System (AMS) 108 communicatively coupled to the supply chain network 102. In the example, the AMS 108 may be communicatively coupled to an operations management system within each of the multiple facilities 104. The AMS 108 may be coupled to the operations management system within each of the multiple facilities 104 via a network 110. The network 110 may be a wireless network or a combination of a wired and wireless network. The network 110 can also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN). Depending on the terminology, the communication network includes various network entities, such as gateways and routers; however, such details have been omitted to maintain the brevity of the description.

Further, the AMS 108 may be implemented in any computing system, such as a storage array, a server, a desktop or a laptop, a computing device, a distributed computing system, or the like. Although not depicted, the AMS 108 may include other components, such as interfaces to communicate over the network or with external storage or computing devices, display, input/output interfaces, operating systems, applications, data, and other software or hardware components (not depicted for the sake of brevity).

In one example, the AMS 108 may obtain data 112-1, 112-2, 112-3, . . . , 112-*n*, collectively referred to as data 112, from the multiple operations management systems 106 at the multiple facilities. In one example, the data 112 received from the multiple operations management systems 106, amongst other information, may include operational data of the assets within each of the multiple facilities 104. Upon obtaining the data 112 from the multiple operations management systems 106 at the multiple facilities 104, the AMS 108 may analyze the data 112. The AMS 108 may analyze the data 112 to calculate various KPIs associated with the assets within each of the multiple facilities within the supply chain network 102. The AMS 108 may display the KPIs associated with the assets within each of the multiple facilities 104 for consumption by decision-making personnel, such as a facility manager.

Figure 2:
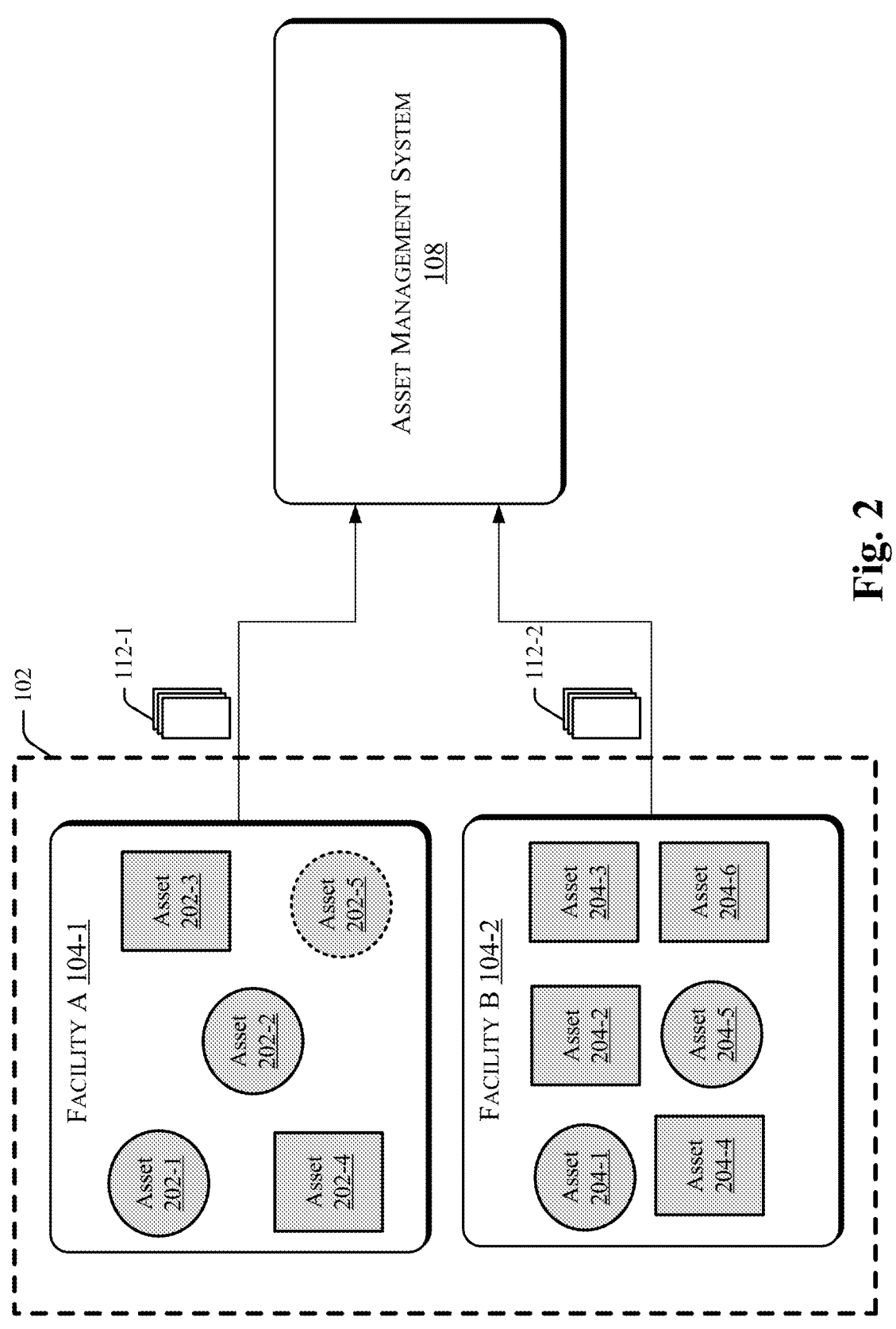
FIG. 2 illustrates the example supply chain network, in accordance with another example of the present subject matter.

FIG. 2 illustrates the supply chain network environment 100, in accordance with another example implementation of the present subject matter. As already described, the supply chain environment 100 may include multiple facilities, such as facility 104-1 and facility 104-2.

In an example, each of the facility 104-1 and facility 104-2 may include a plurality of assets. For instance, the facility 104-1 may include assets 202-1, 202-2, 202-3, 202-4, and 202-5. Similarly, the facility 104-2 may include assets 204-1, 204-2, 204-3, 204-4, 204-5, and 204-6. For the ease of reference, assets 202-1, 202-2, 202-3, 202-4, and 202-5 have been referred to as assets 202; and assets 202-1, 202-2, 202-3, 202-4, and 202-5 have been referred to as assets 204, hereinafter. The assets 202 and 204 within each of the facilities 104-1 and 104-2 may range from machinery, equipment, vehicles, to other operational components involved in the operation of the facilities 104-1 and 104-2.

The supply chain network environment 100 may further include the AMS 108 coupled to each of the multiple facilities 104-1 and 104-2. As explained earlier, a plurality of sensors may be coupled to the assets 202 and 204 for monitoring the operation of the assets 202 and 204. While monitoring the operation of assets within a facility, such as the facility 104-1, the plurality of sensors may capture operational data for the assets within the facility and transmit the operational data to the operations management system 106. The operations management systems 106 may subsequently transmit the operational data 112-1 to the AMS 108. The operations management systems 106 may subsequently transmit the operational data 112-1 to the AMS 108 at various instances. In an example, the operations management systems 106 may transmit the operational data 112-1 to the AMS 108 based on a predetermined schedule identified in accordance with KPI requirements at the AMS 108. For instance, if is determined that it would be beneficial to monitor the KPI for an asset, such as the asset 202-2, every hour to ensure non-disruptive operation of the asset 202-2, the operations management system 106 may capture and transmit the operational data 112-1 for the asset 202-2 to the AMS 108 every hour.

Upon receiving the operational data 112-1 from the facility 104-1, the AMS 108 may calculate various KPIs for the assets 202. The AMS 108 may then store the various KPIs in a data model corresponding to the facility 104-1. In an example, the data model may be a backend aggregation of various data corresponding to the operations of facility. Example data stored and organized by the data model may include a name or identifier of a facility and its location, the assets and their arrangement or location around the facility (which may include manufacturer, model, serial number, age, firmware version, etc.), cost of various assets, maintenance history of assets, and the various sensors and corresponding raw data that is accessible about those assets. In the example, data model may also store the various KPIs that have been created for assets within the facility. In an example, the AMS 108 may then display the KPIs for consumption by the facility manager monitoring the facility 104-1.

In an example, the asset 202-2 may include a storage tank that is storing a hazardous chemical at 98 degrees. An example KPI for the storage tank may be an indication as to whether the temperature is within 2 degrees of 98 degrees, because temperature fluctuations on either side of 98 degrees may have adverse impact on the chemical. A plurality of sensors coupled to the asset 202-2 may track the temperature, every ten minutes. In executing the example KPI, AMS 108 may retrieve the temperature data from the plurality of sensors, perform a conversion to Fahrenheit (if needed), and check to see if the temperature is within the 2-degree range. The AMS 108 may then output an indication of a current temperature of the chemical, and a status that may indicate whether the temperature is in the acceptable range (e.g., within 96-100 degrees) or below/above the range.

In an example implementation, while monitoring the operation of the assets 202 and 204, the facility manager may notice that it would be beneficial to monitor the KPI for the asset 202-2 every 15 minutes instead of every one hour. In such a situation, the facility manager may provide a custom request for modification of the KPI for the asset 202-2. In an example, the facility manager may provide the custom request for modification of the KPI to the AMS 108.

Upon receiving the custom request from the user, the AMS 108 may identify a data model corresponding to the facility including the asset 202-2, i.e., the facility 104-1, where the data model, among other things, may be indicative of information corresponding to assets 202 being monitored in the facility 104-1. Further, the data model of the facility 104-1 may include asset data corresponding to each of the assets 202 of the facility 104-1 and KPIs corresponding to each of the assets 202.

The AMS 108 may then identify a category of the custom request. In an example, the AMS 108 may identify the category of the custom request to generate a query list corresponding to the category of custom request for modification of the asset data in the data model. In the example, the category of custom request may include custom request for modifying asset data corresponding to an asset of the facility or custom request for introducing new asset data in the data model. In the example, since the custom request is for modification of KPI for the asset 202-2, the AMS 108 may identify the category to be the custom request for modifying asset data.

Based on the identification, the AMS 108 may generate a query list for receiving a custom input from the facility manager, where the custom input may include at least one of a selection of an asset; a corresponding asset type; and a script associated with the asset, where the script may include one or more operations for computing the KPI. The AMS 108 may subsequently execute the data model with modified asset data in runtime for dynamic monitoring of the facility.

In another example implementation, a new asset 202-5 may be introduced to the facility 104-1. In an example, once the new asset 202-5 starts operating within the facility 104-1, the facility manager may wish to monitor the operation of the asset 202-5. In such a situation, the facility manger may provide a custom request to facilitate monitoring of the operation of the asset 202-5. The facility manager may provide the custom request for inclusion of the asset 202-5 to the data model to the AMS 108.

Upon receiving the custom request from the user, the AMS 108 may identify a data model corresponding to the facility where the asset 202-5 has been introduced, i.e., the facility 104-1, where the data model, among other things, is indicative of information corresponding to assets 202 being monitored in the facility 104-1. Further, the data model corresponding to the facility 104-1 includes asset data corresponding to each of the assets 202 of the facility 104-1 and KPIs corresponding to each of the assets 202.

The AMS 108 may then identify a category of the custom request to generate a query list corresponding to the category of custom request for modification of the asset data in the data model. As already described, the category of custom request may include custom request for modifying asset data corresponding to an asset of the facility or custom request for introducing new asset data in the data model. In the example, since the custom request is for inclusion of a new asset to the data model corresponding to the facility 104-1, the AMS 108 may identify the category to be the custom request for introducing new asset data in the data model.

Based on the identification, the AMS 108 may generate a query list for receiving a custom input from the facility manager, where the custom input may include at least one of an asset type for a new asset installed in the facility; a facility ID; an asset ID; and a data source corresponding to the asset, where the data source includes a location from which data for the asset is accessed. For instance, in the example described above, the custom input may include an asset type for the asset 202-5, a facility ID for the facility 104-1, an asset ID for the asset 202-5, and the data sources corresponding to the asset, such as source devices coupled to the asset 202-5. The AMS 108 may subsequently execute the data model with modified asset data in runtime for dynamic monitoring of the facility.

The manner in which the data model is modified in response to the custom request from the user is further described in conjunction with the forthcoming figures.

Figure 3:
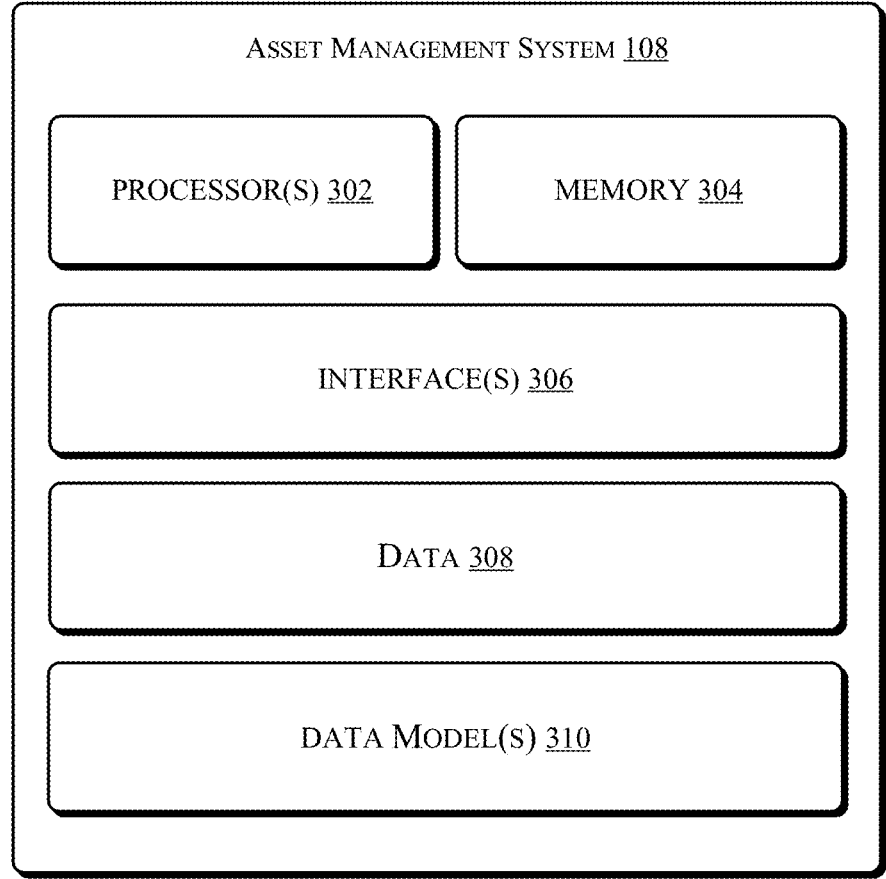
FIG. 3 illustrates an asset management system (AMS) for run-time optimization of data models for facility maintenance operation, in accordance with an example implementation of the present subject matter.

FIG. 3 illustrates the schematics of the AMS 108, in accordance with an example of the present subject matter. As already explained, the AMS 108 may be implemented in any computing system, such as a storage array, a server, a desktop or a laptop, a computing device, a distributed computing system, or the like.

In an example, the AMS 108 may include a processor 302, a memory 304 coupled to the processor 302, and an interface 306 coupled to the memory 304. The functions of various elements shown in the figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA). Other hardware, standard and/or custom, may also be coupled to the processor 302.

The memory 304 may be a computer-readable medium, examples of which include volatile memory (e.g., RAM), and/or non-volatile memory (e.g., Erasable Programmable read-only memory, i.e., EPROM, flash memory, etc.). The memory 304 may be an external memory, or internal memory, such as a flash drive, a compact disk drive, an external hard disk drive, or the like. The memory 304 may further include data which either may be utilized or generated during the operation of the AMS 108.

The interface 306 may allow the connection or coupling of the AMS 108 with one or more other devices, through a wired (e.g., Local Area Network, i.e., LAN) connection or through a wireless connection (e.g., Bluetooth®, WiFi). The interface 306 may also enable intercommunication between different logical as well as hardware components of the AMS 108.

The AMS 108 may further include data 308, that serves, amongst other things, as a repository for storing data that may be fetched, processed, received, or generated by the data model(s) 310. In an example, the data 308 may be stored in the memory 304.

The data 308 may include various data models 310 corresponding to various facilities coupled to the AMS 108. In an example, each of the data models 310 is indicative of information corresponding to assets being monitored in a corresponding facility. Further, each of the data models 310 includes asset data corresponding to each asset of the corresponding facility and KPIs corresponding to each asset of the corresponding facility. An illustration of a data model corresponding to a facility is depicted and explained in conjunction with the FIGS. 4, 5, and 6.

Figure 4:
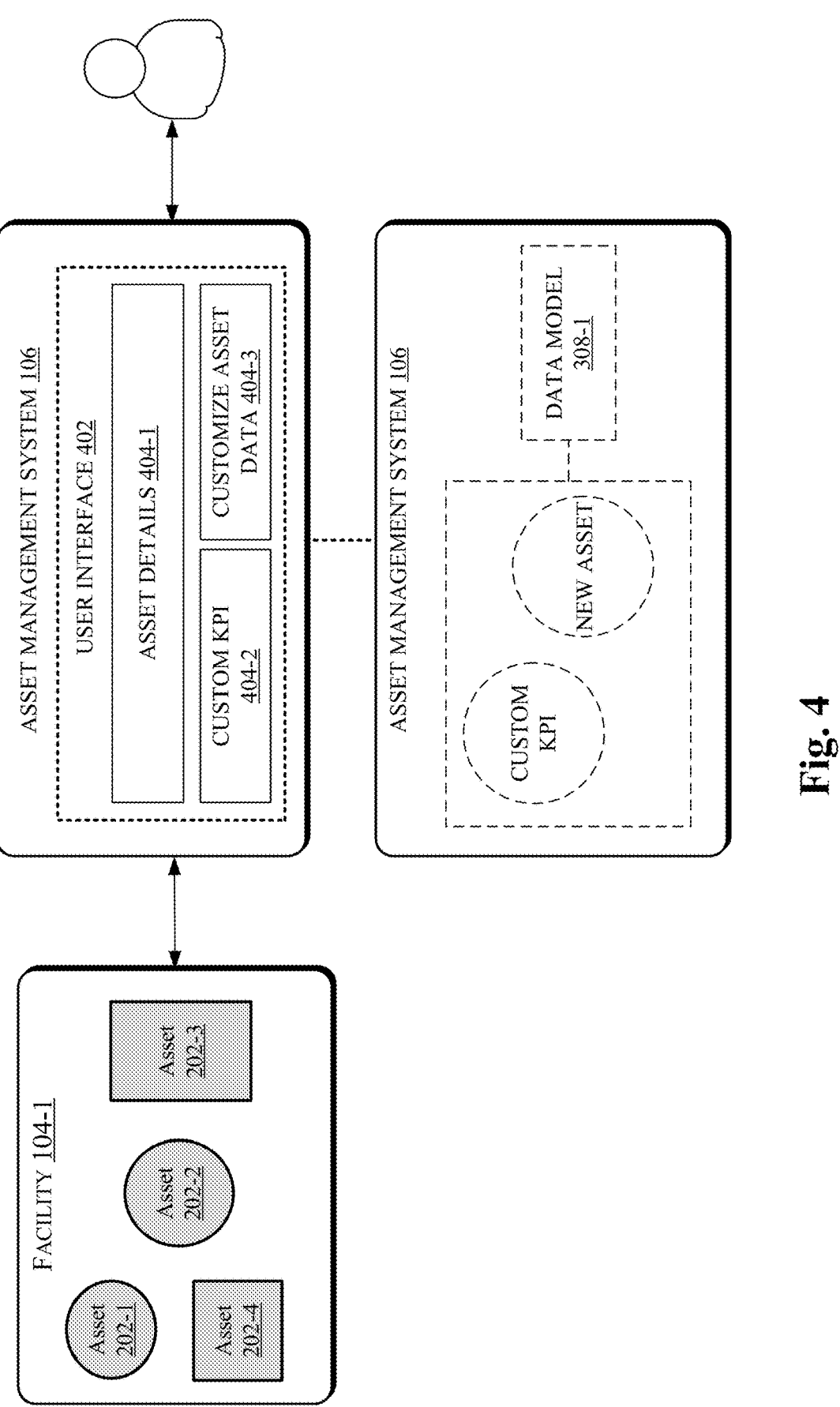
FIG. 4 illustrates the AMS including a data model corresponding to a facility, in accordance with an example implementation of the present subject matter.

FIG. 4 illustrates the AMS 108 including a data model 310-1 corresponding to the facility 104-1, in accordance with an example of the present subject matter. The data model 310-1 may be indicative of information corresponding to assets 202 being monitored in the facility 104-1. Further, the data model 310-1 may include asset data corresponding to each asset of the facility 104-1 and KPIs corresponding to each asset of the facility 104-1.

The AMS 108 may further include a user interface 402 corresponding to the data model 310-1, where the UI 402 may include various design elements, such as buttons 404-1, 404-2, and 404-3; and fields (not shown), for receiving various user inputs for modification of the data model 310-1. The UI 402 may further include other design elements (not shown) for rendering data retrieved from the data model 310-1 in response to the user inputs. In an illustrative example, the UI 402 may include an asset details button 404-1 for retrieving details related to the assets being monitored in the facility 104-1, from the data model 310-1. In the illustrative example, the UI 402 may further include a customize KPI button 404-2 that may allow a user to provide a custom request for modification of KPIs corresponding to the assets 202. The UI 402 may further include a customize asset data 404-3 button that may allow a user to provide a custom input for introducing a new asset in the data model 310-1.

Figure 5:
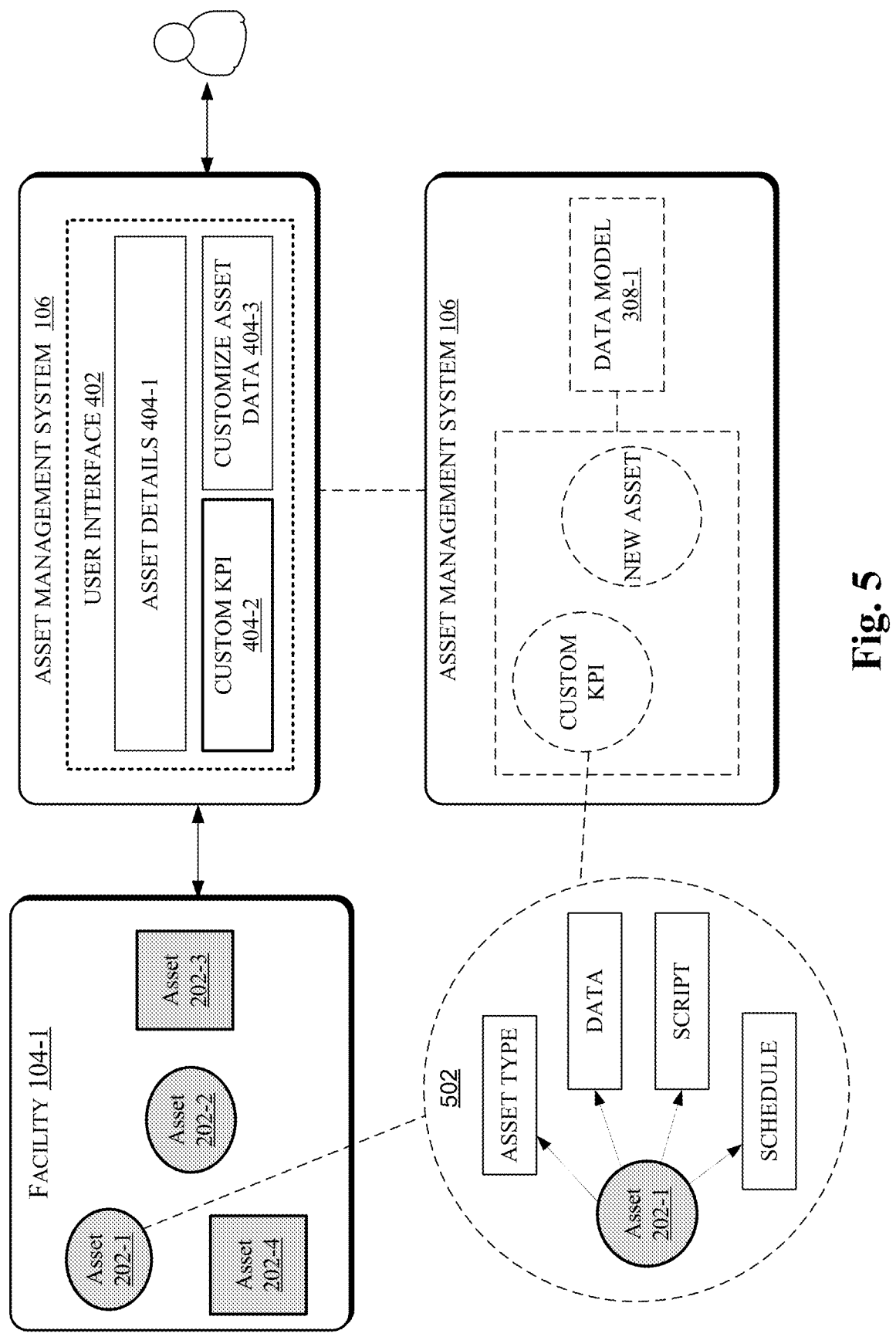
FIG. 5 illustrates the AMS including the data model corresponding to the facility, in accordance with another example implementation of the present subject matter.

FIG. 5 illustrates the AMS 108 including the data model 310-1 corresponding to the facility 104-1, in accordance with another example of the present subject matter. In an example, during the runtime of the facility 104-1, the user may notice that it would be beneficial to modify a KPI corresponding to an asset in the facility 104-1, such as the asset 202-1. In an example, the modification of the KPI corresponding to the asset 202-1 may include modification of an existing KPI, addition of a new KPI, or deletion of an existing KPI.

In response to selection of the customize KPI button 404-2, the processor 302 may cause the AMS 108 to identify a data model corresponding to the facility 104-1, i.e., the data model 310-1. The data model may be indicative of information corresponding to assets 202 being monitored in the facility 104-1. Further, the data model of the facility 104-1 may include asset data corresponding to each of the assets 202 of the facility 104-1 and KPIs corresponding to each of the assets 202. Thus, among other KPIs, the data model 310-1 may also include the KPI corresponding to the asset 202-1.

The processor 302 may then cause the AMS 108 to identify a category of the custom request. The processor 302 may cause the AMS 108 to identify the category of the custom request for generation of a query list corresponding to the category of custom request for modification of the asset data in the data model. As already explained, the category of custom request may include custom request for modifying asset data corresponding to an asset of the facility or custom request for introducing new asset data in the data model. In the example, the custom request may be for addition of a new KPI corresponding to the asset 202-1. Accordingly, the processor 302 may cause the AMS 108 to identify the category to be the custom request for modifying asset data.

Upon identification of the category of the custom request, the processor 302 may cause AMS 108 to generate a query list 502 for receiving a custom input from the user. In an example, the custom input may include at least one of an asset type of the asset, a schedule for computation of the KPI, and a script associated with the asset, wherein the script includes one or more operations for computing a KPI. In an example, the processor 302 may cause the AMS 108 to display the query list 502 on the UI 402.

In an example, the asset type may include the selection of a general asset, such as water pump; a specific manufacturer such as manufacturer XXY; a model such as model Y; or selection of an actual asset located or associated with a facility. Further, the script may include a definition or calculation (which may include data transformations on raw data) of the KPI that is being created or added. Furthermore, the script may include a label or name of the KPI, the actual computation or data transformation of the data that is being utilized by the KPI, and a scorecard that may be used to indicate whether the KPI is in an acceptable range, below an acceptable range, above an acceptable range, needs attention, or needs urgent attention.

In an example, the script may include a particular action that is to be performed by AMS 108 if the value of the KPI exceeds or drops below a threshold. For example, in continuing the example above, if the temperature of the storage tank exceeds 101 degrees, then a notification (such as an email, text message, or visual/audio alert) may be transmitted indicating a dangerous condition. In an example, the user, in such a situation, may manually submit an adjustment in response to the notification. The adjustment may change the operations of the storage tank, such as turning it off, emptying the liquid, turning on a fan, etc. In an example, if no adjustment is received from the user in a certain period of time (e.g., 5 minutes), then AMS 108 may automatically perform a default adjustment of turning off the asset in the dangerous condition.

In an example, when the modification of the KPI includes creation of a new KPI, the AMS 108 may enable the user to reuse and modify existing KPIs stored in the data model 310-1. For example, as described above an existing KPI for a storage tank may indicate whether the temperature fluctuates by more than 2 degrees. The user may select the existing, make a copy of it, and then modify it for the selected asset type. For example, the new KPI may be for a temperature change of more than 4 degrees for the same or different asset. This may allow the user to quickly and effortlessly create the new KPI.

Further, the schedule may indicate how often the KPI is to be executed and/or data is to be retrieved (e.g., continuously, every hour, every day, every week, every month, only on Tuesdays at 12:00 pm, etc.).

The processor 302 may subsequently cause the AMS 108 to receive the custom input from the user, where the custom input may correspond to the query list 502 and add the new KPI in correspondence to the custom input. The processor 302 may subsequently cause the AMS 108 to execute the data model 310-1 with modified asset data in runtime for dynamic monitoring of the facility.

In an example, the processor 302 may cause the AMS 108 to associate the KPI with the asset during run-time while at least a subset of a plurality of predefined KPIs associated with the asset continue to execute and provide values to a user. For example, while the AMS 108 continues to execute and display the results of predefined KPIs on the UI 402, the processor 302 may cause the AMS 108 to update the data model 310-1 with the KPI. In an example, the processor 302 may cause the AMS 108 to update the UI 402 with one or more records corresponding to the KPI. In another example, the processor 302 cause the UI 402 to display a placeholder for the KPI until the KPI is computed in accordance with schedule.

In an example, to execute of the data model 310-1, the processor 302 may cause the AMS 108 to identify the plurality of sensors associated with the asset and receive operational data from the plurality of sensors tracking operations of the asset is received. The processor 302 may then compute the KPI in correspondence to the script and modify the asset data in accordance with the KPI.

Figure 6:
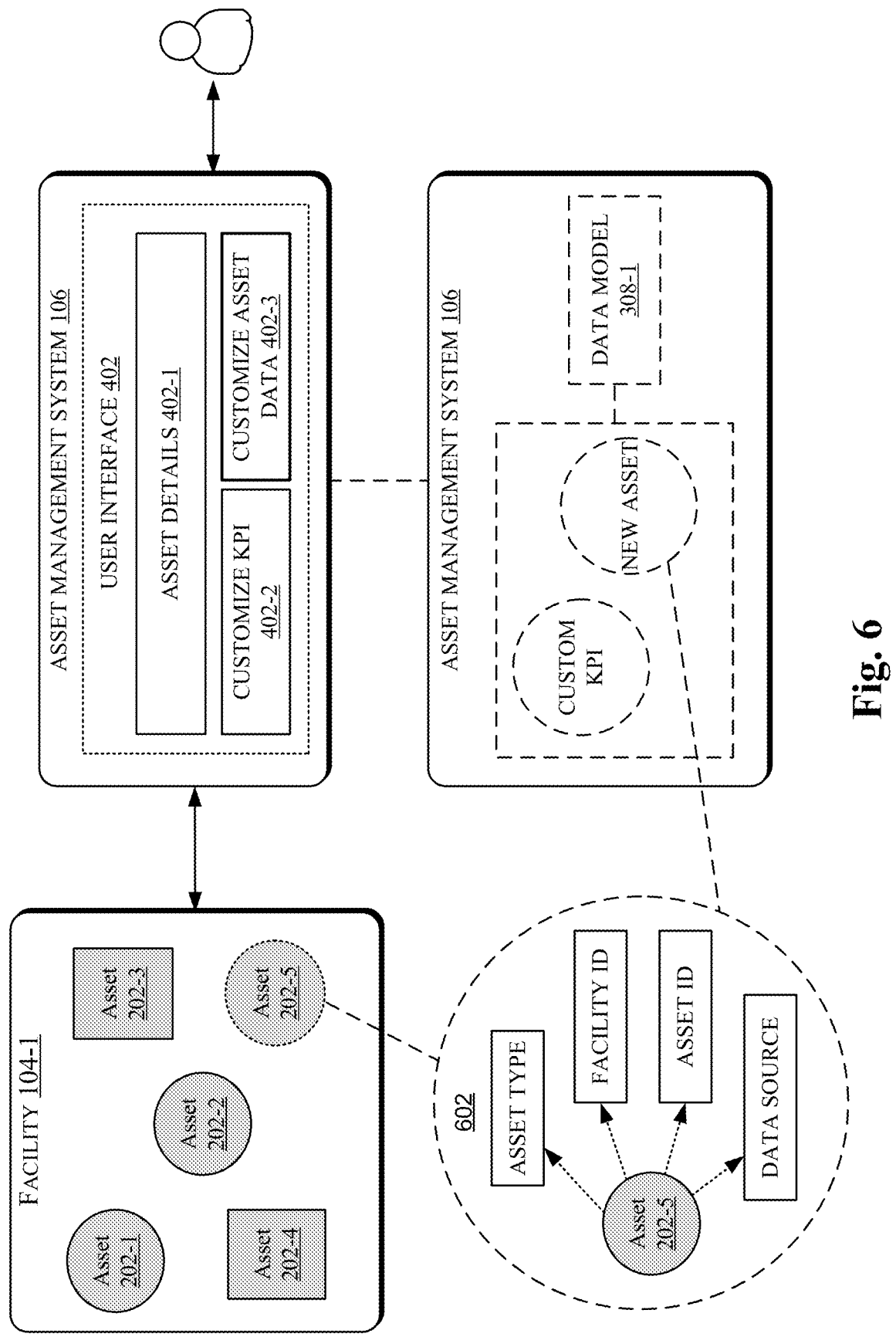
FIG. 6 illustrates the AMS including the data model corresponding to the facility, in accordance with yet another example implementation of the present subject matter.

FIG. 6 illustrates the AMS 108 including the data model 310-1 corresponding to the facility 104-1, in accordance with yet another example of the present subject matter.

In an example, during the runtime of the facility 104-1, the user may notice that a new asset 202-5 has been added to the facility 104-1. In an example, once the new asset 202-5 starts operating within the facility 104-1, the user may wish to monitor the operations of the asset 202-5. In such a situation, the user may select the customize asset data button 404-3 to provide a custom request for inclusion of the asset 202-5 to the data model 310-1.

In response to selection of the customize asset data button 404-3, the processor 302 may cause the AMS 108 to identify a data model corresponding to the facility 104-1, i.e., the data model 310-1. As already described, the data model may be indicative of information corresponding to assets 202 being monitored in the facility 104-1. Further, the data model of the facility 104-1 may include asset data corresponding to each of the assets 202 of the facility 104-1 and KPIs corresponding to each of the assets 202.

The processor 302 may then cause the AMS 108 to identify a category of the custom request. The processor 302 may cause the AMS 108 to identify the category of the custom request for generation of a query list corresponding to the category of custom request for modification of the asset data in the data model. In the example, since the custom request is for addition of the new asset 202-5 to the data model 310-1, the processor 302 may cause the AMS 108 to identify the category to be the custom request for introducing new asset data in the data model.

Upon identification of the category of the custom request, the processor 302 may cause AMS 108 to generate a query list 602 for receiving custom input from the user for introduction of the new asset data in the data model 310-1. The custom input may include at least one of an asset type for a new asset installed in the facility; location of the new asset within the facility; a facility ID; an asset ID; and a data source corresponding to the asset, where the data source includes a location from which data for the asset is accessed. In an example, the processor 302 may cause the AMS 108 to display the query list 602 on the UI 402.

In an example, the facility ID may indicate a building, region, city, town, state, sales territory, zip code, or other locational information about the new asset. Further, the Asset ID may be a system generated identification number and/or a user label that is used to identify the new asset. In an example, the AMS 108 may ensure that no two assets have the same asset ID (e.g., even if they are the same model, make, year, manufacturer). Moreover, the data source may indicate from where to retrieve the raw data. For example, a new asset may have its own sensors that may have to be initialized or connected to the AMS 108.

The AMS 108 may subsequently modify the data model 310-1 in correspondence to the custom input. For instance, in the example described above, the custom input may include an asset type for the asset 202-5, a facility ID for the facility 104-1, an asset ID for the asset 202-5, and the data sources corresponding to the asset, such as sensors coupled to the asset 202-5.

The processor 302 may then cause the AMS 108 to execute the data model with modified asset data in runtime for dynamic monitoring of the facility.

In an example, once the data model 310-1 has been modified to include the asset 202-5, the processor 302 of the AMS 108 may generate a notification on the UI 402 to set up KPIs corresponding to the asset 202-5. Upon selection of the notification, the processor 302 may cause AMS 108 to generate a query list 502 for receiving a custom input from the user for addition of the KPIs corresponding to the asset 202-5, to the data model 310-1. The manner in which the KPIs corresponding to the asset 202-5 are added to the data model 310-1 have been explained in conjunction with FIG. 5 and are not reproduced for the sake of brevity.

FIGS. 7, 8, and 9 illustrate methods 700, 800, and 900 for run-time optimization of data models for facility maintenance operation, in accordance with examples of the present subject matter. Although the methods 700, 800, and 900 may be implemented for servicing of a variety of computing devices, for the ease of explanation, the present description of the example methods 700, 800, and 900 is provided in reference to the above-described AMS 108. The order in which the various method blocks of methods 700, 800, and 900 are described, is not intended to be construed as a limitation, and any number of the described method blocks may be combined in any order to implement the methods 700, 800, 900 or an alternative method.

The blocks of the methods 700, 800, and 900 may be implemented through instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

In FIG. 7, at block 702, a custom request to modify a data model of a facility may be received. In an example, the custom request to modify the data model may be received from a user. Further, the data model may be indicative of information corresponding to assets monitored in the facility and may include asset data corresponding to each asset of the facility and key performance indicators (KPIs) corresponding to each asset of the facility.

At block 704, a category of the custom request may be identified. In an example, the category of custom request may be identified to generate a query list corresponding to the category of custom request for modifying asset data in the data model. Further, the custom request may be one of updating asset data corresponding to an asset of the facility and introducing new asset data in the data model.

In an example, updating of asset data corresponding to an asset of the facility may include modifying a KPI corresponding to the asset. In the example, modifying the KPI corresponding to the asset includes. adding a new KPI corresponding to the asset, modifying an existing KPI corresponding to the asset, and deleting an existing KPI corresponding to the asset.

At block 706, a custom input may be received from the user in response to the query list generated. In an example, when the category of custom request is identified to be the custom request for updating asset data, the custom input includes at least one of an asset type of the asset, a schedule for computation of the KPI, and a script associated with the asset, wherein the script includes one or more operations for computing the KPI. On the other hand, when the category of custom request is identified to be the custom request for introducing new asset data in the data model, the custom input includes at least one of an asset type for a new asset installed in the facility; location of the new asset within the facility; a facility ID; an asset ID; and a data source corresponding to the asset, where the data source includes a location from which data for the asset is accessed. The data model may then be modified in correspondence to the custom input.

At block 708, the data model may be executed with modified asset data in runtime for dynamic monitoring of the facility. In an example, when the category of custom request is identified to be the custom request for updating asset data, the execution of the modified data model may include identifying a plurality of sensors associated with the asset, accessing operational data from the plurality of sensors tracking operations of the asset, and computing the KPI in correspondence to the script and modifying the asset data in accordance with the KPI. The KPI may then be associated with the asset.

In an example, the execution of the modified data model may further include associating the KPI to the asset. In an example, the KPI may be associated with the asset during run-time while at least a subset of a plurality of predefined KPIs associated with the asset continue to execute and provide values to a user.

The KPI may then be displayed. In an example, the KPI may be displayed based on the schedule for computation of the KPI. Further, until the KPI is computed in accordance with the schedule the KPI, a placeholder for the KPI may be displayed. Further, it may then be determined that the output of the data model exceeds a threshold associated with the KPI. In an example, the threshold may be received from a user prior to execution of the data model with the modified asset data. Based on the determination, a notification may be generated to one or more users in correspondence to the output of the data model.

In FIG. 8, at block 802, a custom request may be received to modify a key performance indicator (KPI) corresponding to an asset of a facility. In an example, the custom request to modify the KPI may be received from a user. Further, the KPI may be stored in a data model, where the data model includes asset data corresponding to each asset of the facility and KPIs corresponding to each asset of the facility.

At block 804, a query list may be generated, where the query list may correspond to the custom request for modifying the KPI. In an example, modification of the KPI may include adding a new KPI corresponding to the asset, modifying an existing KPI corresponding to the asset, and deleting an existing KPI corresponding to the asset.

At block 806, a custom input may be received from the user in response to the generation of the query list. In an example, the custom input includes at least one of an asset type of the asset, a schedule for computation of the KPI, and a script associated with the asset, wherein the script includes one or more operations for computing the KPI. In the example, the data model may then be modified in correspondence to the custom input.

At block 808, the data model may be executed with modified KPI corresponding to the asset in runtime for dynamic monitoring of the facility. In an example, In FIG. 9, at block 902, a custom request to introduce a new asset into a data model for a facility may be received. In an example, the custom request to introduce the new asset may be received from a user, such as a facility manager. In the example, the data model may include asset data corresponding to each asset of the facility and key performance indicators (KPIs) corresponding to each asset of the facility.

At block 904, a query list corresponding to the custom request may be generated. In an example, the query list may be generated for introducing the new asset.

At block 906, a custom input may be received from the user in response to the generation of the query list. In an example, the custom input may include at least one of an asset type for a new asset installed in the facility; location of the new asset within the facility; a facility ID; an asset ID; and a data source corresponding to the asset, where the data source includes a location from which data for the asset is accessed. In the example, the data model may be modified in correspondence to the custom input.

At block 908, the data model corresponding to the new asset may be executed in runtime for dynamic monitoring of the facility.

Figure 10:
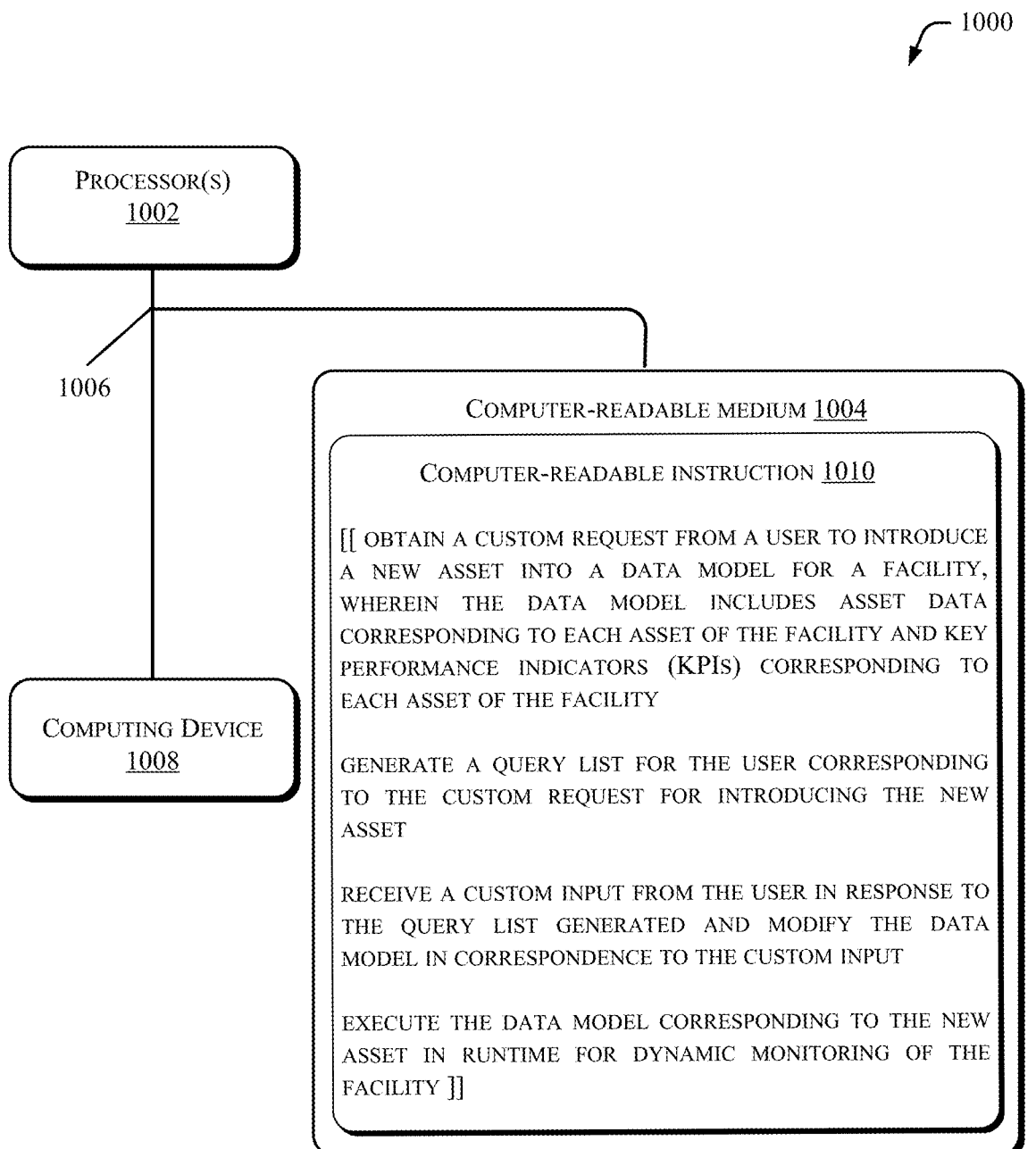
FIG. 10 illustrates a non-transitory computer-readable medium for run-time optimization of data models for facility maintenance operation, in accordance with an example implementation of the present subject matter.

FIG. 10 illustrates a non-transitory computer-readable medium for run-time optimization of data models for facility maintenance operation, in accordance with an example of the present subject matter.

In an example, the computing environment 1000 includes processor 1002 communicatively coupled to a non-transitory computer readable medium 1004 through communication link 1006. In an example, the processor 1002 may have one or more processing resources for fetching and executing computer-readable instructions from the non-transitory computer readable medium 1004. The processor 1002 and the non-transitory computer readable medium 1004 may be implemented, for example, in the AMS 108.

The non-transitory computer readable medium 1004 may be, for example, an internal memory device or an external memory. In an example implementation, the communication link 1006 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 1004 includes a set of computer readable instructions 1010 which may be accessed by the processor 1002 through the communication link 1006 and subsequently executed for reconfiguring the data pipeline. The processor(s) 1002 and the non-transitory computer readable medium 1004 may also be communicatively coupled to a computing device 1008 over the network.

Referring to FIG. 10, in an example, the non-transitory computer readable medium 1004 includes computer readable instructions 1010 that cause the processor 1002 to obtain a custom request from a user to introduce a new asset into a data model for a facility. In an example, the data model includes asset data corresponding to each asset of the facility and key performance indicators (KPIs) corresponding to each asset of the facility.

The instructions 1010 may further cause the processor 1002 to generate a query list for the user corresponding to the custom request for introducing the new asset.

Further, the instructions 1010 may cause the processor 1002 to receive a custom input from the user in response to the generated query list and modify the data model in correspondence to the custom input. In an example, the custom input may include at least one of an asset type for a new asset installed in the facility; location of the new asset within the facility; a facility ID; an asset ID; and a data source corresponding to the asset, where the data source includes a location from which data for the asset is accessed.

The instructions 1010 may further cause the processor 1002 to execute the data model corresponding to the new asset in runtime for dynamic monitoring of the facility.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method implemented by an Asset Management System (AMS), the method comprising: obtaining, by the AMS, a custom request from a user to modify a data model of a facility, wherein the data model is indicative of information corresponding to assets monitored in the facility, and wherein the data model of the facility includes asset data corresponding to each asset of the facility and key performance indicators (KPIs) corresponding to each asset of the facility; identifying, by the AMS, a category of the custom request to generate a query list corresponding to the category of custom request for modifying asset data in the data model, wherein the custom request includes at least one of updating asset data corresponding to an asset of the facility and introducing new asset data in the data model; receiving, by the AMS, a custom input from the user in response to the query list generated and modifying, by the AMS, the data model in correspondence to the custom input; executing, by the AMS, the modified data model with modified asset data in runtime for dynamic monitoring of the facility, the executing comprising: computing, by the AMS, a KPI by executing a KPI script to perform data transformations on the modified asset data: and automatically performing, by the AMS, a default control action on the asset when an output of the data model exceeds a threshold associated with the KPI and in absence of a user adjustment within a predefined period; wherein updating asset data corresponding to an asset of the facility comprises modifying a KPI corresponding to the asset; and wherein modifying the KPI corresponding to the asset comprises adding a new KPI corresponding to the asset, modifying an existing KPI corresponding to the asset, and deleting an existing KPI corresponding to the asset.

2. The method of claim 1, wherein the custom input comprises at least one of an asset type of the asset, a schedule for computation of the KPI, and the KPI script indicating one or more operations for computing the KPI corresponding to the asset, when the custom request is for updating asset data corresponding to an asset of the facility.

3. The method of claim 2, further comprises:
identifying a plurality of sensors associated with the asset;
accessing operational data from the plurality of sensors tracking operations of the asset; and
computing the KPI in correspondence to the script and modifying the asset data in accordance with the KPI.

4. The method of claim 3, further comprising displaying the KPI based on the schedule for computation of the KPI.

5. The method of claim 4, further comprising displaying a placeholder for the KPI until the KPI is computed in accordance with the schedule.

6. The method of claim 3, further comprising associating the KPI to the asset during run-time while at least a subset of a plurality of predefined KPIs associated with the asset continue to execute and provide values to a user.

7. The method of claim 3, further comprising:
determining whether the output of the data model exceeds a threshold associated with the KPI, wherein the threshold is received from a user prior to the executing the data model with modified asset data; and
generating a notification to one or more users in correspondence to the output of the data model.

8. The method of claim 1, wherein the custom input comprises at least one of an asset type for a new asset installed in the facility, a facility ID, an asset ID, and a data source including a location from which data for the asset is accessed, when the custom request is for introducing new asset data in the data model.

9. An Asset Management System (AMS) comprising: at least one processor; at least one memory storing instructions that, when executed by the at least one processor, cause the AMS at least to: obtain a custom request from a user to modify a key performance indicator (KPI) corresponding to an asset of a facility, wherein the KPI is stored in a data model, and wherein the data model includes asset data corresponding to each asset of the facility and KPIs corresponding to each asset of the facility; generate a query list corresponding to the custom request for modifying the KPI; receive a custom input from the user in response to the query list generated and modifying the data model in correspondence to the custom input; execute the modified data model with modified KPI corresponding to the asset in runtime for dynamic monitoring of the facility, the executing comprising: compute a KPI by executing a KPI script to perform data transformations on the modified KPI; and automatically perform a default control action on the asset when an output of the data model exceeds a threshold associated with the KPI and in absence of a user adjustment within a predefined period; wherein the custom input comprises at least one of an asset type of the asset, a schedule for computation of the KPI, and the KPI script indicating one or more operations for computing the KPI corresponding to the asset; and wherein to modify the KPI corresponding to the asset, the processor is to cause the AMS to add a new KPI corresponding to the asset, modify an existing KPI corresponding to the asset, and delete an existing KPI corresponding to the asset.

10. The AMS of claim 9, wherein the processor causes the AMS to associate the KPI to the asset during run-time while at least a subset of a plurality of predefined KPIs associated with the asset continue to execute and provide values to a user.

11. The AMS of claim 9, wherein the processor further causes the AMS to determine whether the output of the data model exceeds a threshold associated with the KPI, wherein the threshold for the KPI is received from a user prior to executing the data model with the KPI.

12. The AMS of claim 11, wherein the processor causes the AMS to generate an alert upon determining that the output of the data model exceeds the threshold value associated with the KPI.

13. The AMS of claim 9, wherein the processor causes the AMS to: identify one or more sensors associated with the asset; access operational data from a plurality of sensors tracking operations of the asset; and compute the KPI in correspondence to the script and modify the asset data in accordance with the KPI.

14. The AMS of claim 13, wherein the processor causes the AMS to display a placeholder for the KPI until the KPI is computed in accordance with the schedule for computation of the KPI.

15. A non-transitory computer-readable medium comprising instructions for run-time optimization of data models for facility maintenance operation, the instructions being executable by a processor to: obtain a custom request from a user to introduce a new asset into a data model for a facility, wherein the data model includes asset data corresponding to each asset of the facility and key performance indicators (KPIs) corresponding to each asset of the facility; generate a query list for the user corresponding to the custom request for introducing the new asset; receive a custom input from the user in response to the query list generated and modify the data model in correspondence to the custom input; execute the modified data model corresponding to the new asset in runtime for dynamic monitoring of the facility, the executing comprising: compute a KPI by executing a KPI script to perform data transformations on the new asset data; and automatically perform a default control action on the new asset when an output of the data model exceeds a threshold associated with the KPI and in absence of a user adjustment within a predefined period; wherein the custom input comprises at least one of an asset type of the asset, a schedule for computation of the KPI, and the KPI script indicating one or more operations for computing the KPI corresponding to the asset; and wherein to modify the KPI corresponding to the asset, the processor is to cause the AMS to add a new KPI corresponding to the asset, modify an existing KPI corresponding to the asset, and delete an existing KPI corresponding to the asset.

16. The non-transitory computer-readable medium as claimed in claim 15, wherein the custom input comprises at least one of an asset type for a new asset installed in the facility, a facility ID, an asset ID, and a data source including a location from which data for the asset is accessed.

\* \* \* \* \*